(12) United States Patent
Kim et al.

(10) Patent No.: US 12,083,860 B2
(45) Date of Patent: Sep. 10, 2024

(54) REFRIGERANT CIRCULATING APPARATUS FOR VEHICLE

(71) Applicants: Hyundai Motor Company, Seoul (KR); Kia Corporation, Seoul (KR)

(72) Inventors: Yeonho Kim, Seoul (KR); Wan Je Cho, Hwaseong-si (KR); Seong-Bin Jeong, Hwaseong-si (KR); Jeawan Kim, Hwaseong-si (KR); Man Hee Park, Suwon-si (KR); Jae Yeon Kim, Hwaseong-si (KR); Tae Hee Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 17/837,886

(22) Filed: Jun. 10, 2022

(65) Prior Publication Data
US 2023/0173880 A1 Jun. 8, 2023

(30) Foreign Application Priority Data
Dec. 6, 2021 (KR) .................. 10-2021-0172602

(51) Int. Cl.
*B60H 1/00* (2006.01)
*B60H 1/32* (2006.01)

(52) U.S. Cl.
CPC ..... *B60H 1/00885* (2013.01); *B60H 1/00342* (2013.01); *B60H 1/00485* (2013.01); *B60H 1/3227* (2013.01); *B60H 1/3229* (2013.01); *B60H 1/323* (2013.01);
(Continued)

(58) Field of Classification Search
CPC ............ B60H 1/00885; B60H 1/00342; B60H 1/00485; B60H 1/3227; B60H 1/3229; B60H 1/323; B60H 1/00899; B60H 2001/00928; B60H 2001/3283; B60H 1/3202; B60H 2001/3291; B60H 1/00571; B60Y 2200/91; B60Y 2304/01; B62D 63/025; F25B 41/42; F25B 41/31; F25B 5/02
See application file for complete search history.

(56) References Cited

U.S. PATENT DOCUMENTS

| | | | | |
|---|---|---|---|---|
| 2,528,557 A * | 11/1950 | Shapiro | ........... | F25B 41/30 210/453 |
| 7,389,649 B2 * | 6/2008 | Pham | ........... | F25B 49/005 62/223 |
| 9,561,704 B2 * | 2/2017 | Enomoto | ........... | B60K 11/02 |
| 10,634,402 B2 * | 4/2020 | Kim | ........... | B60H 1/00385 |

(Continued)

FOREIGN PATENT DOCUMENTS

| | | | | |
|---|---|---|---|---|
| JP | 5391379 B2 * | 1/2014 | ......... | B60H 1/00278 |
| WO | WO-2021049435 A1 * | 3/2021 | ......... | B60H 1/00342 |

*Primary Examiner* — Ljiljana V. Ciric
(74) *Attorney, Agent, or Firm* — MORGAN, LEWIS & BOCKIUS LLP

(57) ABSTRACT

A refrigerant circulating apparatus for a vehicle, includes at least one heat exchanger configured to heat-exchange a refrigerant; at least one valve provided to selectively flow the refrigerant to the at least one heat exchanger; and a refrigerant distribution unit having a first surface on which the at least one heat exchanger and the at least one valve are provided and a second surface on which at least one flow path through which the refrigerant circulates through the at least one heat exchanger and the at least one valve is provided.

19 Claims, 8 Drawing Sheets

(52) U.S. Cl.
CPC .............. *B60H 1/00899* (2013.01); *B60H 2001/00928* (2013.01); *B60H 2001/3283* (2013.01)

(56) References Cited

U.S. PATENT DOCUMENTS

| | | | | |
|---|---|---|---|---|
| 11,299,032 B2* | 4/2022 | Cho | ........................ | B60K 11/02 |
| 11,440,376 B2* | 9/2022 | Calderone | ............ | B60K 7/0007 |
| 11,754,204 B2* | 9/2023 | Kesler | ..................... | F16L 3/222 |
| | | | | 248/68.1 |
| 11,807,070 B2* | 11/2023 | Kim | ..................... | B60H 1/3229 |
| 11,808,496 B2* | 11/2023 | Miyawaki | ............. | F28F 9/0275 |
| 2004/0020233 A1* | 2/2004 | Ramachandran | ....... | G01L 21/10 |
| | | | | 62/292 |
| 2007/0113575 A1* | 5/2007 | Borre | ..................... | F25B 45/00 |
| | | | | 62/292 |
| 2015/0292781 A1* | 10/2015 | Yoo | ........................ | F25B 13/00 |
| | | | | 62/324.1 |
| 2017/0241687 A1* | 8/2017 | Litch | ........................ | F25B 5/02 |
| 2017/0297414 A1* | 10/2017 | Beloe | ................. | B60H 1/00885 |
| 2018/0272840 A1* | 9/2018 | Onishi | .............. | B60H 1/00899 |
| 2019/0039440 A1 | 2/2019 | Calderone | | |
| 2019/0145675 A1* | 5/2019 | Kim | ................... | B60H 1/00342 |
| | | | | 62/324.6 |
| 2021/0086587 A1* | 3/2021 | Koberstein | .............. | B60H 1/22 |
| 2021/0347246 A1* | 11/2021 | Cho | ................ | B60H 1/00271 |
| 2022/0402328 A1* | 12/2022 | Kim | ................ | B60H 1/00535 |
| 2023/0143363 A1* | 5/2023 | Oh | ....................... | B60H 1/3229 |
| | | | | 62/498 |
| 2023/0173880 A1* | 6/2023 | Kim | .................... | B60H 1/3229 |
| | | | | 62/115 |
| 2023/0173892 A1* | 6/2023 | Kim | ................... | B60H 1/00571 |
| | | | | 62/115 |

* cited by examiner

REFRIGERANT CIRCULATING APPARATUS FOR VEHICLE

CROSS-REFERENCE TO RELATED APPLICATION

The present application claims priority to Korean Patent Application No. 10-2021-0172602, filed on Dec. 6, 2021, the entire contents of which is incorporated herein for all purposes by this reference.

BACKGROUND OF THE PRESENT DISCLOSURE

Field of the Present Disclosure

The present disclosure relates to a refrigerant circulating apparatus for a vehicle, and more particularly, to a refrigerant circulating apparatus for a vehicle, which is included in an air conditioning system applied for indoor cooling and heating of a purpose built vehicle (PBV), and configured for minimizing use of piping while improving mountability of each constituent element.

DESCRIPTION OF RELATED ART

Recently, the vehicle industry has been introducing a new concept of future mobility vision for realizing a human-centered and dynamic future city.

One of these future mobility solutions is a purpose built vehicle (PBV) as purpose-based mobility.

The PBV indicates an eco-friendly mobility solution that provides customized services for occupants while they travel to their destination on the ground, and may set optimal paths for each situation and perform platooning using electric vehicle-based artificial intelligence.

In other words, the PBV is a means of transportation and a fixed facility with case-related techniques, and a separate driver seat is unnecessary as it has an autonomous driving function. Furthermore, an indoor space thereof has infinite expandability.

Such a PBV may not only perform a role of a shuttle that moves a large number of people, but may also be changed to a recreational space such as a restaurant, a cafe, a hotel, and a movie theater, and an essential facility such as a hospital and a pharmacy.

Herein, the PBV is powered by an electric motor, and is formed to include a skateboard-like rolling chassis (referred to as an underbody or skateboard in the art) with batteries spreading on a lower portion thereof and an upper body where occupants can board.

The PBV configured as described above is provided with an air conditioning system for controlling the indoor temperature of the upper body, and in the instant case, it is difficult to position components included in a refrigerant circulating apparatus of the air conditioning system in a narrow mounting space, and a layout of pipes through which a refrigerant flows becomes complicated.

Furthermore, some components of the refrigerant circulating apparatus may be mounted on the upper body due to limitation of the mounting space of the rolling chassis, and thus an internal space of the upper body is reduced.

To solve these problems, there is a need to develop a technique for mounting on a rolling chassis by simplifying piping of the refrigerant circulating apparatus and promoting modularization.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a refrigerant circulating apparatus for a vehicle, which is provided in an air conditioning system applied for indoor cooling and heating of a purpose built vehicle (PBV), and configured for minimizing use of piping while improving mountability of each constituent element.

Various aspects of the present disclosure are directed to providing a refrigerant circulating apparatus for a vehicle, including: at least one heat exchanger configured to heat-exchange a refrigerant; at least one valve provided to selectively flow the refrigerant to the at least one heat exchanger; and a refrigerant distribution unit having a first surface on which the at least one heat exchanger and the at least one valve are provided and a second surface on which at least one flow path through which the refrigerant circulates through the at least one heat exchanger and the at least one valve is provided.

The refrigerant distribution unit may include: a main plate having a plurality of penetration holes 132a that are formed to correspond to the at least one heat exchanger and the at least one valve and a first surface to which the at least one heat exchanger and the at least one valve are mounted; and at least one path body coupled to the main plate so that at least one path through which the refrigerant flows is formed by selectively connecting the penetration holes on a second surface of the main plate.

The at least one flow path body may have a surface facing the second surface of the main plate, which is opened so that the at least one flow path is formed between the main plate and the at least one flow path body.

The at least one heat exchanger may condense or evaporate the refrigerant introduced thereto through heat exchange with a coolant.

The at least one heat exchanger may include: a condenser configured to condense a refrigerant supplied from a compressor; and first and second evaporators configured to evaporate the refrigerant ejected from the condenser.

The at least one valve may include: a first valve connected to the condenser and the first evaporator to selectively introduce the refrigerant ejected from the condenser into the first evaporator; and a second valve connected to the condenser and the second evaporator to selectively introduce the refrigerant ejected from the condenser into the second evaporator.

The at least one heat exchanger may include: a condensing unit configured to condense an introduced refrigerant; an evaporator provided integrally with the condensing unit to evaporate the introduced refrigerant; and a partition wall partitioning the condensing unit and the evaporating unit.

The at least one valve may include: a first valve configured to selectively introduce or bypass the refrigerant into the condensing unit; a second valve connected to the first valve to introduce the refrigerant bypassed by the first valve; a third valve connected to the second valve and connected to the condensing unit to selectively introduce the refrigerant ejected from the condensing unit; and a fourth valve connected to the third valve to selectively introduce the refrigerant introduced from the third valve into the evaporator.

The at least one valve may control a flow of the refrigerant or selectively expand the introduced refrigerant.

It may further include a gas-liquid separator configured to separate a gaseous refrigerant or a liquid refrigerant from the refrigerant condensed or evaporated while passing through the at least one heat exchanger.

The refrigerant distribution unit may be connected to a compressor provided outside through a connection member.

The at least one heat exchange may be a water-cooled heat exchanger for exchanging the introduced refrigerant with a coolant.

As described above, in accordance with the refrigerant circulating apparatus for a vehicle according to the exemplary embodiment of the present disclosure, which is provided in an air conditioning system applied for indoor cooling and heating of a purpose built vehicle (PBV), it is possible to reduce a manufacturing cost by minimizing use of piping while improving mountability of each constituent element.

Furthermore, according to an exemplary embodiment of the present disclosure, it is possible to minimize heat loss which may occur while the refrigerant moves by minimizing the use of a pipe through which the refrigerant is circulated.

According to an exemplary embodiment of the present disclosure, it is also possible to simplify a layout in a narrow space in the front of a vehicle, and improve mountability, assembling ability, and maintainability by promoting modularization of the refrigerant circulating apparatus.

Furthermore, according to an exemplary embodiment of the present disclosure, it is possible to maximize an indoor space of a vehicle which may be applied for various purposes by mounting the refrigerant circulating apparatus modularized in a purpose built vehicle (PBV) on a vehicle body.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
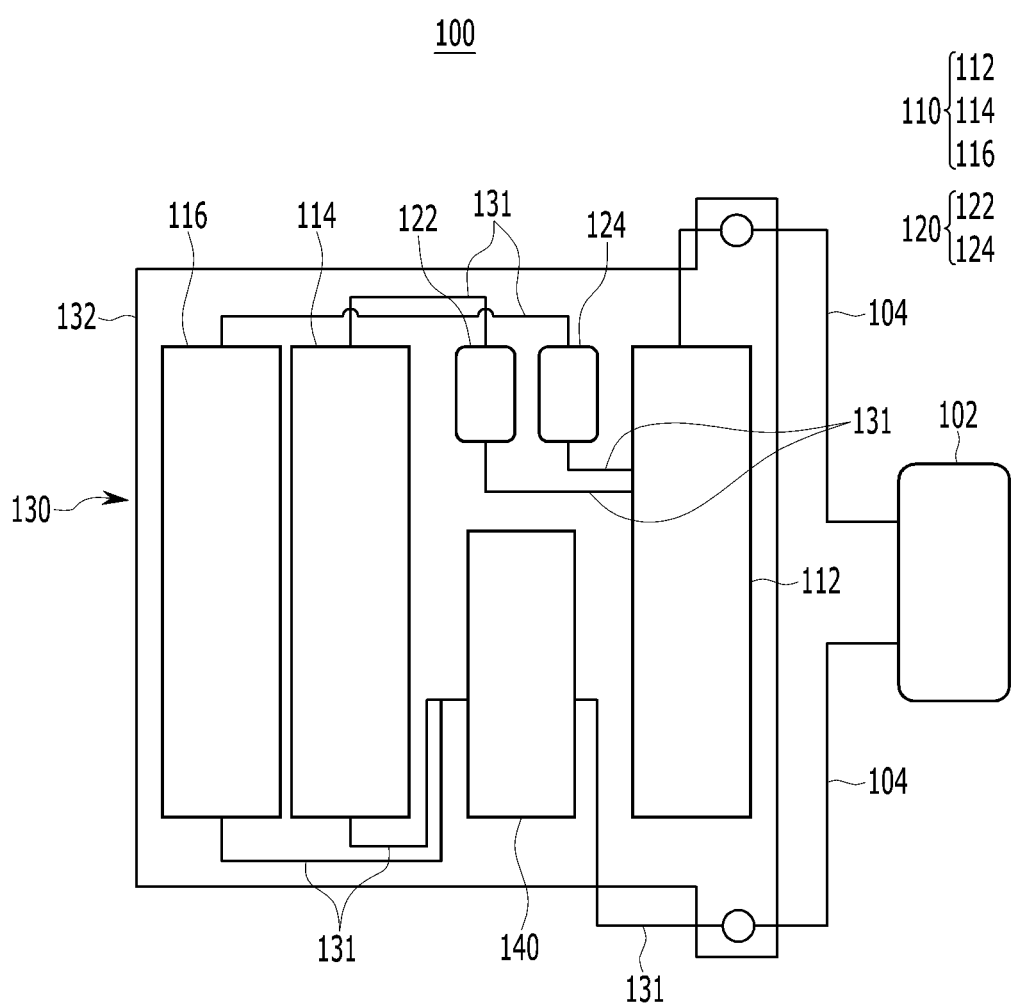
FIG. 1 illustrates a schematic diagram of a refrigerant circulating apparatus for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Since the embodiments described in the specification and the configurations shown in the drawings are merely the most preferable embodiments and configurations of the present disclosure, they do not represent all of the technical ideas of the present disclosure, and it should be understood that various equivalents and modified examples, which may replace the embodiments, are possible, when filing the present application.

To clearly describe the present disclosure, parts that are irrelevant to the description are omitted, and identical or similar constituent elements throughout the specification are denoted by the same reference numerals.

Because the size and thickness of each configuration shown in the drawings are arbitrarily shown for convenience of description, the present disclosure is not necessarily limited to configurations illustrated in the drawings, and to clearly illustrate several parts and areas, enlarged thicknesses are shown.

Furthermore, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
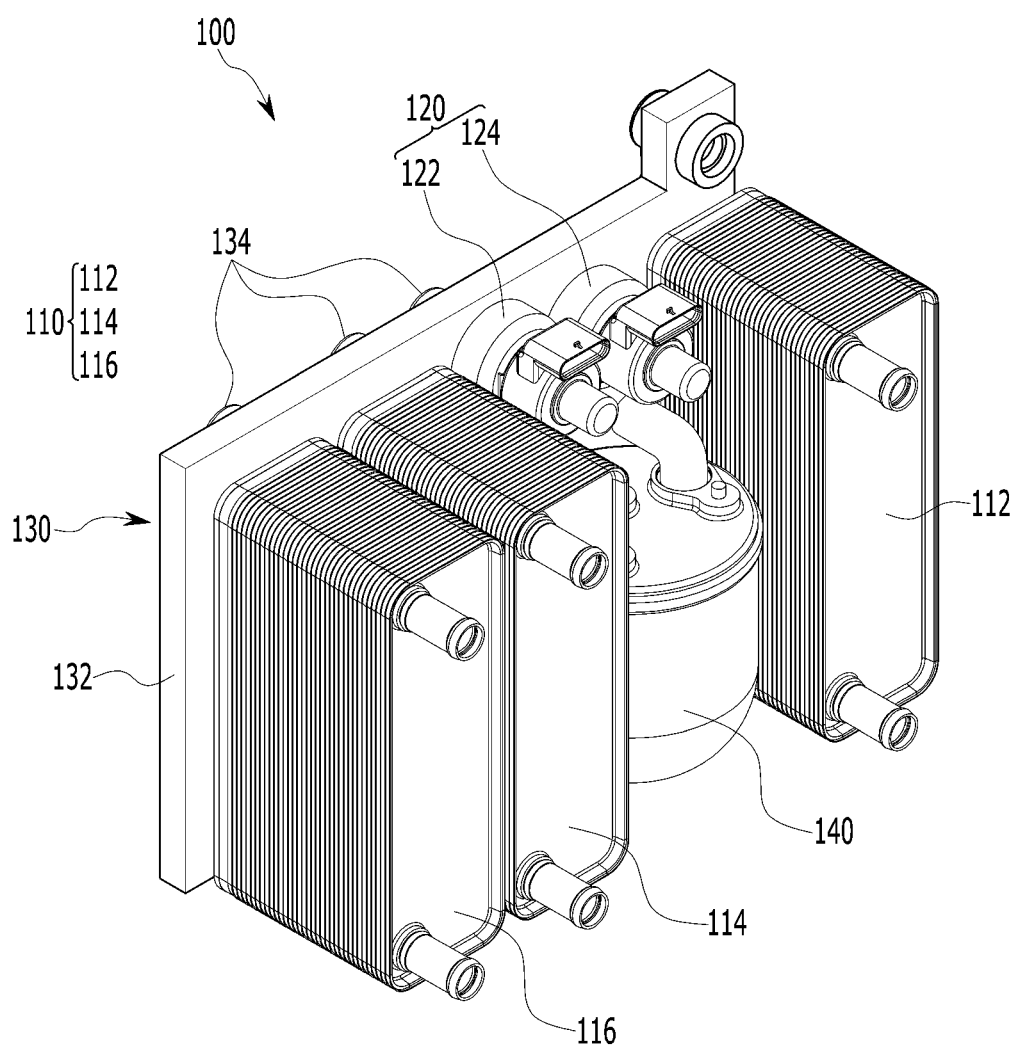
FIG. 2 illustrates a front perspective view of the refrigerant circulating apparatus for a vehicle according to the various exemplary embodiments of the present disclosure.
Figure 3:
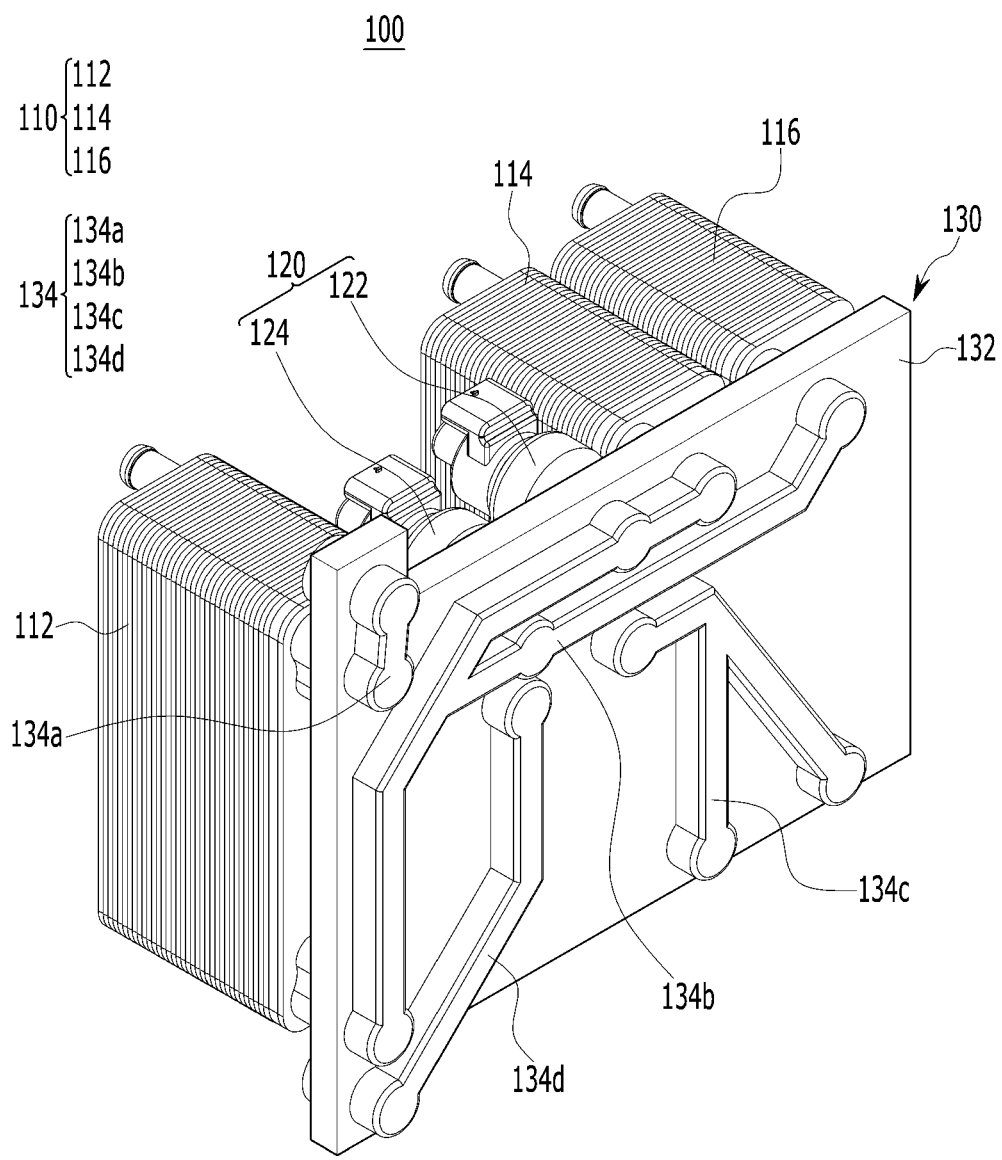
FIG. 3 illustrates a rear perspective view of the refrigerant circulating apparatus for a vehicle according to the various exemplary embodiments of the present disclosure.
Figure 4:
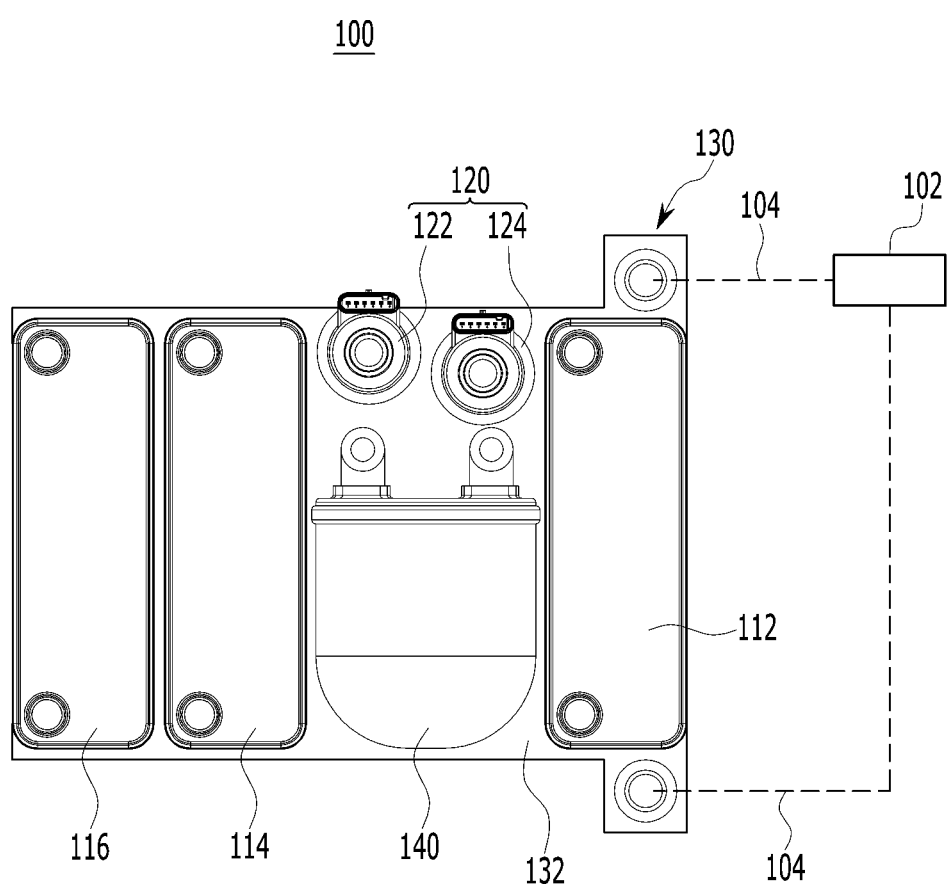
FIG. 4 illustrates a front view of the refrigerant circulating apparatus for a vehicle according to the various exemplary embodiments of the present disclosure.

FIG. 1 illustrates a schematic diagram of a refrigerant circulating apparatus for a vehicle according to various exemplary embodiments of the present disclosure, FIG. 2 illustrates a front perspective view of the refrigerant circulating apparatus for a vehicle according to the various exemplary embodiments of the present disclosure, FIG. 3 illustrates a rear perspective view of the refrigerant circulating apparatus for a vehicle according to the various exemplary embodiments of the present disclosure, and FIG. 4 illustrates a front view of the refrigerant circulating apparatus for a vehicle according to the various exemplary embodiments of the present disclosure.

Various exemplary embodiments of the present disclosure may be applied to, e.g., purpose-based mobility (purpose built vehicle: hereinafter referred to as PBV).

The PBV is an electric vehicle-based eco-friendly mobile vehicle that provides customized services required for passengers while they travel to their destination on the ground.

The PBV may be configured for setting an optimal path for each situation and performing platooning, and furthermore, may be a box-type design vehicle having a large internal space.

Such a PBV includes a skateboard-like rolling chassis (also referred to as an underbody in the art) and an upper body mounted on the rolling chassis.

A battery assembly may be mounted on the rolling chassis, and a driving motor may be provided.

Referring to FIG. 1, FIG. 2, FIG. 3, and FIG. 4, according to the various exemplary embodiments of the present disclosure, the refrigerant circulating apparatus 100 is provided in an air conditioning system applied for indoor cooling and heating of a purpose built vehicle (PBV), configured for reducing a manufacturing cost by minimizing use of piping while improving mountability of each constituent element.

To the present end, the refrigerant circulating apparatus 100 according to the various exemplary embodiments of the present disclosure includes at least one heat exchanger 110, at least one valve 120, and a refrigerant distribution unit 130.

First, the at least one heat exchanger 110 may heat-exchange a refrigerant.

The at least one heat exchanger 100 condenses or evaporates the refrigerant introduced therein through heat exchange with a coolant.

That is, the at least one heat exchanger 100 may be a water-cooled heat exchanger for exchanging the introduced refrigerant with the coolant.

In the various exemplary embodiments of the present disclosure, the at least one valve 120 may be provided to selectively flow the refrigerant through the at least one heat exchanger 110.

The at least one valve 120 may control a flow of the refrigerant or may selectively expand the introduced refrigerant.

Furthermore, the at least one heat exchanger 110 and the at least one valve 120 may be mounted on a first surface of the refrigerant distribution unit 130.

A plurality of flow paths 131 through which the refrigerant is circulated through the at least one heat exchanger 110 and the at least one valve 120 may be provided on a second surface of the refrigerant distribution unit 130.

Meanwhile, in the various exemplary embodiments of the present disclosure, the at least one heat-exchanger 110 may include a condenser 112, a first evaporator 114, and a second evaporator 116.

First, the condenser 112 may condense the refrigerant supplied from the compressor 102. The condenser 112 may be mounted on the first surface of the refrigerant distribution unit 130.

Furthermore, the first and second evaporators 114 and 116 may selectively receive and evaporate the refrigerant ejected from the condenser 112. The first and second evaporators 114 and 116 may be mounted at a position spaced from the condenser 110 on the first surface of the refrigerant distribution unit 130.

Herein, the at least one valve 120 may include a first valve 122 and a second valve 124 to selectively flow the refrigerant through the condenser 112, the first evaporator 114, and the second evaporator 116.

First, the first valve 122 may be connected to the condenser 112 and the first evaporator 114 through the flow paths 131 to selectively introduce the refrigerant ejected from the condenser 112 into the first evaporator 114.

Furthermore, the second valve 124 may be connected to the condenser 112 and the second evaporator 116 through the flow paths 131 to selectively introduce the refrigerant ejected from the condenser 112 into the second evaporator 116.

The first and second valves 122 and 124 configured in the instant way may be mounted on the refrigerant distribution unit 130 between the condenser 112 and the first evaporator 114.

Hereinafter, the refrigerant distribution unit 130 according to the various exemplary embodiments of the present disclosure will be described in more detail with reference to FIG. 5 to FIG. 7.

Figure 5:
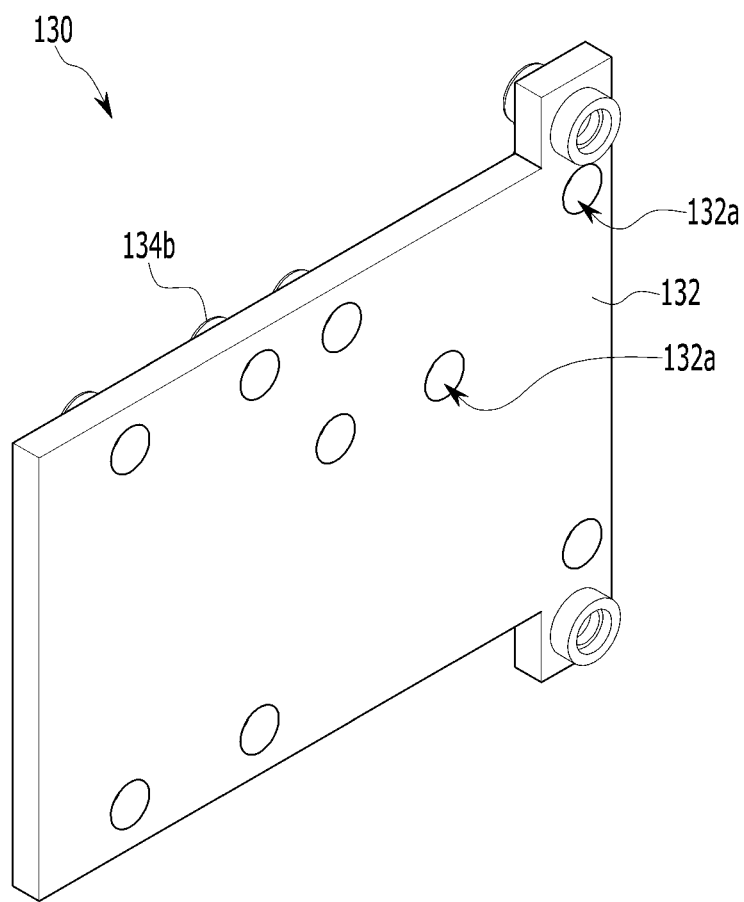
FIG. 5 illustrates a front perspective view of a refrigerant distribution unit applied to the refrigerant circulating apparatus for a vehicle according to the various exemplary embodiments of the present disclosure.
Figure 6:
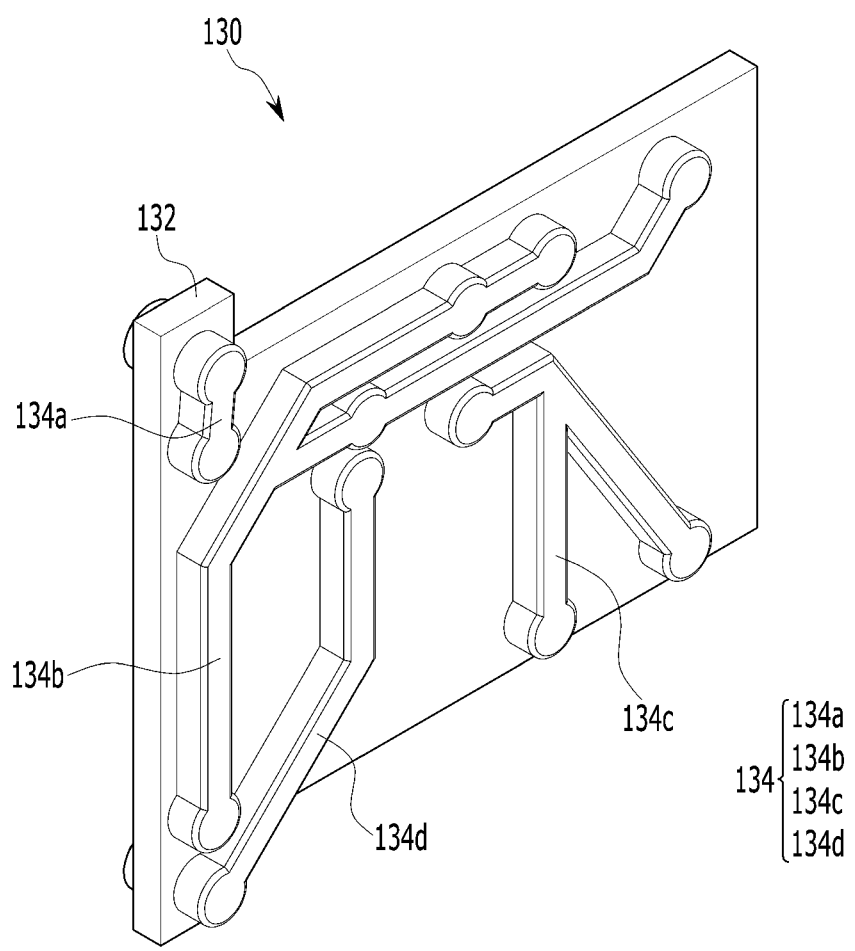
FIG. 6 illustrates a rear perspective view of a refrigerant distribution unit applied to the refrigerant circulating apparatus for a vehicle according to the various exemplary embodiments of the present disclosure.
Figure 7:
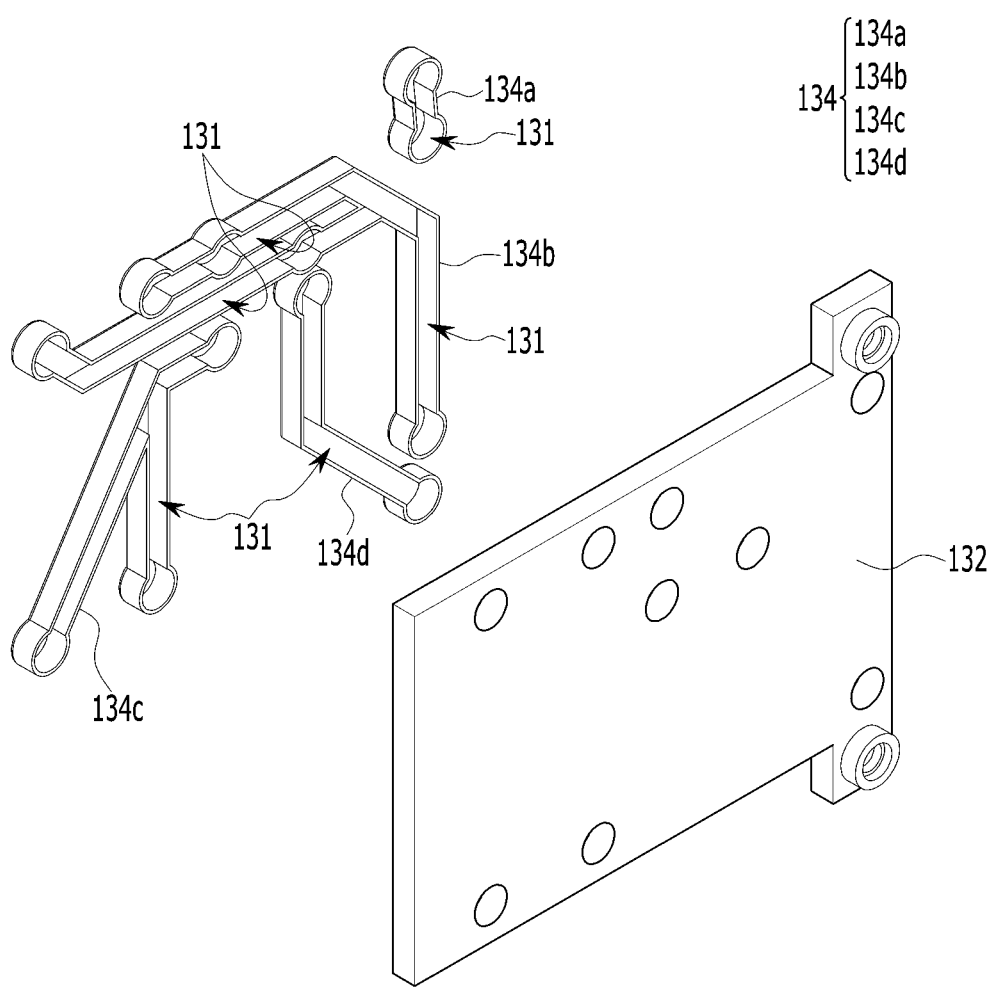
FIG. 7 illustrates an exploded perspective view of a refrigerant distribution unit applied to the refrigerant circulating apparatus for a vehicle according to the various exemplary embodiments of the present disclosure.

FIG. 5 illustrates a front perspective view of a refrigerant distribution unit applied to the refrigerant circulating apparatus for a vehicle according to the various exemplary embodiments of the present disclosure, FIG. 6 illustrates a rear perspective view of a refrigerant distribution unit applied to the refrigerant circulating apparatus for a vehicle according to the various exemplary embodiments of the present disclosure, and FIG. 7 illustrates an exploded perspective view of a refrigerant distribution unit applied to the refrigerant circulating apparatus for a vehicle according to the various exemplary embodiments of the present disclosure.

Referring to FIG. 5 to FIG. 7, according to the various exemplary embodiments of the present disclosure, the refrigerant distribution unit 130 includes a main plate 132 and at least one path body 134.

First, in the main plate 132, a plurality of penetration holes 132a may be formed to correspond to the at least one heat exchanger 110 and the at least one valve 120.

The at least one heat-exchanger 110 and the at least one valve 120 may be mounted on a first surface of the main plate 132 through the penetration holes 132a.

That is, in the various exemplary embodiments of the present disclosure, the condenser 112, the first evaporator 114, the second evaporator 116, the first valve 122, and the second valve 124 are mounted on the first surface of the main plate 132.

Furthermore, the path body 134 may include a plurality of path bodies 134, and may be coupled to the main plate 132 so that the penetration holes 132a are selectively connected thereto on a second surface of the main plate to form the flow paths 131 through which the refrigerant flows.

First surfaces of the path bodies 134 facing the second surface of the main plate 132 may be opened so that the flow paths 131 are formed between the path bodies 134 and the main plate 132 in a state of being coupled to the second surface of the main plate 132.

The refrigerant distribution unit 130 configured in the instant way may be connected to the compressor 102 externally provided through a connection member 104.

Furthermore, the refrigerant circulating apparatus 100 may further include a gas-liquid separator 140 for separating a gaseous refrigerant or a liquid refrigerant from the refrigerant condensed or evaporated while passing through the at least one heat exchanger 110.

That is, in the various exemplary embodiments of the present disclosure, the gas-liquid separator 140 may separate a gaseous refrigerant and a liquid refrigerant from the refrigerant that has passed through the first and second evaporators 114 and 116.

The gas-liquid separator 140 may supply the gaseous refrigerant among the refrigerant introduced from the first evaporator 114 or the second evaporator 116 to the compressor 102.

Accordingly, the gas-liquid separator 140 may supply only the gaseous refrigerant to the compressor 102, improving efficiency and durability of the compressor 102.

Meanwhile, in the various exemplary embodiments of the present disclosure, the path bodies 134 may include a first path body 134a, a second path body 134b, a third path body 134c, and a fourth path body 134d.

First, the first path body 134a may connect the connection member 104 and the condenser 112 so that the refrigerant supplied from the compressor 102 to the refrigerant distribution unit 130 through the connection member 104 flows into the condenser 112.

The second path body 134b may interconnect the condenser 112, the first valve 122, the second valve 124, the first evaporator 114, and the second evaporator 116 so that the refrigerant ejected from the condenser 112 flows into the first evaporator 114 through the first valve 122 or into the second evaporator 116 through the second valve 124.

Herein, the refrigerant ejected from the condenser 112 by operations of the first and second valves 122 and 124 is selectively introduced into the first and second evaporators 114 and 116, or may be simultaneously introduced into the first and second evaporators 114 and 116.

The third path body 134c may interconnect the first and second evaporators 114 and 116 and the gas-liquid separator 140 so that the refrigerant ejected from the first evaporator 114 or the second evaporator 116 flows into the gas-liquid separator 140.

Furthermore, the fourth path body 134d may connect the gas-liquid separator 140 and the connecting member 104 so that the refrigerant ejected from the gas-liquid separator 140 flows into the compressor 102 through the connection member 104.

Accordingly, in the refrigerant circulating apparatus 100 configured as described above, the condenser 112, the first evaporator 114, the second evaporator 116, the first valve 122, the second valve 124, and the gas-liquid separator 140 may be connected to the compressor 102 to circulate the refrigerant by each of the flow paths 131 formed by the refrigerant distribution unit 130, reducing a manufacturing cost by minimizing use of piping while improving mountability of each constituent element.

Furthermore, the refrigerant circulating apparatus 100 may minimize use of a pipe through which the refrigerant is circulated using the refrigerant distribution unit 130, minimizing heat loss which may occur while the refrigerant moves.

A refrigerant circulating apparatus 200 according to various exemplary embodiments of the present disclosure will be described with reference to FIG. 8.

Figure 8:
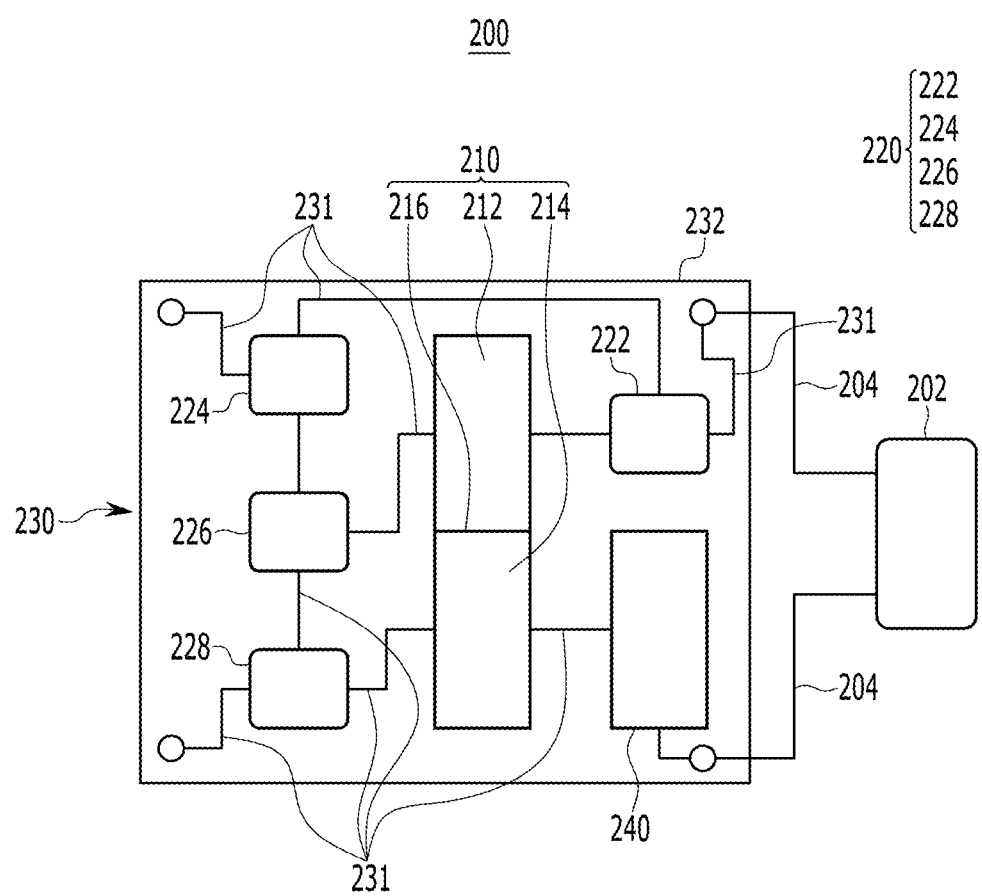
FIG. 8 illustrates a schematic diagram of a refrigerant circulating apparatus for a vehicle according to various exemplary embodiments of the present disclosure.

FIG. 8 illustrates a schematic diagram of a refrigerant circulating apparatus 200 for a vehicle according to various exemplary embodiments of the present disclosure.

Referring to FIG. 8, the refrigerant circulating apparatus 200 according to the various exemplary embodiments of the present disclosure includes at least one heat exchanger 210, at least one valve 220, and a refrigerant distribution unit 230.

First, the at least one heat exchanger 210 may heat exchange a refrigerant. The at least one heat exchanger 200 condenses or evaporates the refrigerant introduced therein through heat exchange with a coolant.

That is, the at least one heat exchanger 200 may be a water-cooled heat exchanger for exchanging the introduced refrigerant with the coolant.

In the various exemplary embodiments of the present disclosure, the at least one valve 220 may be provided to selectively flow the refrigerant through the at least one heat exchanger 210.

The at least one valve 220 may control a flow of the refrigerant or may selectively expand the introduced refrigerant.

Furthermore, the at least one heat exchanger 210 and the at least one valve 220 may be mounted on a first surface of the refrigerant distribution unit 230.

A plurality of flow paths 231 through which the refrigerant is circulated through the at least one heat exchanger 210 and the at least one valve 220 may be provided on a second surface of the refrigerant distribution unit 230.

Furthermore, the refrigerant distribution unit 230 may be connected to the compressor 202 externally provided through a connection member 204.

As in the various exemplary embodiments of the present disclosure, the refrigerant distribution unit 230 configured in the instant way may include a main plate 232 and a plurality of path bodies forming the flow paths 231, and a description of the detailed configuration will be omitted.

Meanwhile, in the various exemplary embodiments of the present disclosure, the heat exchanger 210 may be configured as a single unit, and may be mounted on a first surface of the refrigerant distribution unit 130.

The heat exchanger 210 may include a condensing unit 212, an evaporating unit 214, and a partition wall 216.

First, the condensing unit 212 may condense the refrigerant introduced therein through heat exchange with a coolant.

The evaporating unit 214 may be provided integrally with the condensing unit 212 to evaporate the introduced refrigerant through heat exchange with the coolant.

Furthermore, the partition wall 216 may partition the condensing unit 212 and the evaporating unit 214 so that the refrigerant flowing into the condensing unit 212 and the refrigerant flowing into the evaporating unit 214 are not mixed in the heat exchanger 210.

The heat exchanger 210 configured in the instant way may be mounted on a first surface of the refrigerant distribution unit 230.

The at least one valve 220 may include first, second, third, and fourth valves 222, 224, 226, and 228 to selectively flow the refrigerant through the condensing unit 212 and the evaporating unit 214.

First, the first valve 222 is mounted on the first surface of the refrigerant distribution unit 230, and may selectively introduce or bypass the refrigerant into the condensing unit 212.

The first valve 222 may be connected to the condensing unit 212 and the second valve 224 through the flow paths 231 to selectively introduce the refrigerant into the condensing unit 212 or to bypass the refrigerant through the second valve 224.

The second valve 224 may be mounted on the first surface of the refrigerant distribution unit 230, and may be connected to the first valve 222 so that the refrigerant bypassed by the first valve 222 is introduced thereto.

This second valve 224 may be connected to a separate heat exchanger provided outside the refrigerant circulating apparatus 200 through the flow paths 231.

The third valve 226 may be mounted on the first surface of the refrigerant distribution unit 230, and may be connected to the second valve 224 through the flow paths 231. The third valve 226 may be connected to the condensing unit 212 through the flow paths 231 so that the refrigerant ejected from the condensing unit 212 is selectively introduced thereto.

Furthermore, the fourth valve 228 may be mounted on the first surface of the refrigerant distribution unit 230, and may be connected to the third valve 226 through the flow paths 231. The fourth valve 228 may selectively introduce the refrigerant introduced from the third valve 226 into the evaporating unit 214.

Herein, the fourth valve 228 may be connected to a separate heat exchanger provided outside the refrigerant circulating apparatus 200 through the flow paths 231. That is, the fourth valve 228 may selectively supply the refrigerant introduced from a separate heat exchanger provided external to the evaporating unit 214.

Furthermore, according to the various exemplary embodiments of the present disclosure, the refrigerant circulating apparatus 100 may further include a gas-liquid separator 240 for separating a gaseous refrigerant or a liquid refrigerant from the refrigerant condensed or evaporated while passing through the heat exchanger 210.

That is, in the various exemplary embodiments of the present disclosure, the gas-liquid separator 240 may separate a gaseous refrigerant and a liquid refrigerant from the refrigerant that has passed through the evaporating unit 214.

The gas-liquid separator 240 may supply the gaseous refrigerant among the refrigerant introduced from the evaporating unit 214 to the compressor 202.

Accordingly, the gas-liquid separator 240 may supply only the gaseous refrigerant to the compressor 202, improving efficiency and durability of the compressor 202.

The refrigerant circulating apparatus 200 according to the various exemplary embodiments of the present disclosure configured in the instant way may use one heat exchanger 210 in which the condensing unit 212 and the evaporating unit 214 are integrally formed, to circulate the refrigerant supplied from the compressor 202 to the compressor 202 through selective actuation of the first, second, third, and fourth valves 222, 224, 226, and 228 in accordance with a vehicle mode.

Accordingly, when the refrigerant circulating apparatus 100 or 200 for a vehicle according to the exemplary embodiment of the present disclosure configured as described above, which is provided in an air conditioning system applied for indoor cooling and heating of a purpose built vehicle (PBV) is applied, it is possible to reduce a manufacturing cost by minimizing use of piping while improving mountability of each constituent element.

Furthermore, according to an exemplary embodiment of the present disclosure, it is possible to minimize heat loss which may occur while the refrigerant moves by minimizing the use of a pipe through which the refrigerant is circulated.

According to an exemplary embodiment of the present disclosure, it is also possible to simplify a layout in a narrow space in the front of a vehicle, and improve mountability, assembling ability, and maintainability by promoting modularization of the refrigerant circulating apparatus 100 or 200.

Furthermore, according to an exemplary embodiment of the present disclosure, it is possible to maximize an indoor space of a vehicle which may be applied for various purposes by mounting the refrigerant circulating apparatus 100 or 200 modularized in a purpose built vehicle (PBV) on a vehicle body.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A refrigerant circulating apparatus for a vehicle, the refrigerant circulating apparatus comprising:
   at least one heat exchanger configured to heat-exchange a refrigerant;
   at least one valve provided to selectively flow the refrigerant to the at least one heat exchanger; and
   a refrigerant distribution unit having:
      a first surface on which the at least one heat exchanger and the at least one valve are provided; and
      a second surface, wherein at least one flow path through which the refrigerant circulates through the at least one heat exchanger and the at least one valve is provided on the second surface,
   wherein the refrigerant distribution unit includes:
      a main plate having:
         a plurality of penetration holes, wherein the plurality of penetration holes are formed to correspond to the at least one heat exchanger and the at least one valve; and
         a first surface to which the at least one heat exchanger and the at least one valve are mounted; and
      at least one path body coupled to the main plate so that at least one path through which the refrigerant flows is formed by selectively connecting the penetration holes on a second surface of the main plate.

2. The refrigerant circulating apparatus of claim 1, wherein the at least one path body has a surface facing the second surface of the main plate, which is opened so that the at least one flow path is formed between the main plate and the at least one flow path body.

3. The refrigerant circulating apparatus of claim 1, wherein the at least one heat exchanger condenses or evaporates the refrigerant introduced to the at least one heat exchanger, through heat exchange with a coolant.

4. The refrigerant circulating apparatus of claim 1, wherein the at least one heat-exchanger includes:
- a condenser configured to condense the refrigerant supplied from a compressor; and
- first and second evaporators configured to evaporate the refrigerant ejected from the condenser.

5. The refrigerant circulating apparatus of claim 4, wherein the first and second evaporators are connected to the condenser in parallel.

6. The refrigerant circulating apparatus of claim 5, wherein the first and second valves are positioned on the refrigerant distribution unit between the condenser and the first evaporator.

7. The refrigerant circulating apparatus of claim 4, wherein the at least one valve includes:
- a first valve connected to the condenser and the first evaporator to selectively introduce the refrigerant ejected from the condenser into the first evaporator; and
- a second valve connected to the condenser and the second evaporator to selectively introduce the refrigerant ejected from the condenser into the second evaporator.

8. The refrigerant circulating apparatus of claim 4, further including:
- a gas-liquid separator is connected to the first and second evaporators and configured to separate a gaseous refrigerant or a liquid refrigerant from the refrigerant condensed or evaporated while passing through the first and second evaporators.

9. The refrigerant circulating apparatus of claim 1, wherein the at least one heat exchanger includes:
- a condensing unit configured to condense the refrigerant;
- an evaporator provided integrally with the condensing unit to evaporate the refrigerant; and
- a partition wall partitioning the condensing unit and the evaporating unit.

10. The refrigerant circulating apparatus of claim 9, wherein the at least one valve includes:
- a first valve configured to selectively introduce or bypass the refrigerant into the condensing unit;
- a second valve connected to the first valve to introduce the refrigerant bypassed by the first valve;
- a third valve connected to the second valve and connected to the condensing unit to selectively introduce the refrigerant ejected from the condensing unit; and
- a fourth valve connected to the third valve to selectively introduce the refrigerant introduced from the third valve into the evaporator.

11. The refrigerant circulating apparatus of claim 10, further including:
- a gas-liquid separator connected to the evaporator and configured to separate a gaseous refrigerant or a liquid refrigerant from the refrigerant condensed or evaporated while passing through the evaporator.

12. The refrigerant circulating apparatus of claim 10, wherein the condensing unit and the evaporator are positioned between the first value and one of the second, third and fourth valves.

13. The refrigerant circulating apparatus of claim 12, wherein the condensing unit and the evaporator are positioned between the first and second valves, between the first and third valves, and between the first and fourth valves.

14. The refrigerant circulating apparatus of claim 10, wherein the second valve is configured to be connected outside the refrigerant distribution unit.

15. The refrigerant circulating apparatus of claim 10, wherein the fourth valve is configured to be connected outside the refrigerant distribution unit.

16. The refrigerant circulating apparatus of claim 1, wherein the at least one valve controls a flow of the refrigerant or selectively expands the refrigerant.

17. The refrigerant circulating apparatus of claim 1, further including:
- a gas-liquid separator configured to separate a gaseous refrigerant or a liquid refrigerant from the refrigerant condensed or evaporated while passing through the at least one heat exchanger.

18. The refrigerant circulating apparatus of claim 1, wherein the refrigerant distribution unit is connected to a compressor provided outside through a connection member.

19. The refrigerant circulating apparatus of claim 1, wherein the at least one heat exchanger is a water-cooled heat exchanger for heat-exchanging the refrigerant with a coolant.

* * * * *